(12) United States Patent
Kaspo

(10) Patent No.: US 11,576,748 B2
(45) Date of Patent: Feb. 14, 2023

(54) DENTAL IMPLEMENT

(71) Applicant: CinZara, LLC, Troy, MI (US)

(72) Inventor: Ghabi Kaspo, Troy, MI (US)

(73) Assignee: CinZara, LLC, Troy, MI (US)

( * ) Notice: Subject to any disclaimer, the term of this patent is extended or adjusted under 35 U.S.C. 154(b) by 367 days.

(21) Appl. No.: 16/776,746

(22) Filed: Jan. 30, 2020

(65) Prior Publication Data

US 2021/0236237 A1 Aug. 5, 2021

(51) Int. Cl.
*A61C 1/08* (2006.01)

(52) U.S. Cl.
CPC ............ *A61C 1/085* (2013.01); *A61C 1/084* (2013.01)

(58) Field of Classification Search
CPC ................................ A61C 1/084; A61C 1/085
See application file for complete search history.

(56) References Cited

U.S. PATENT DOCUMENTS

| | | | |
|---|---|---|---|
| 4,820,156 A | 4/1989 | Ross | |
| 5,087,201 A * | 2/1992 | Mondani | A61C 8/0024 433/225 |
| 5,098,293 A * | 3/1992 | Loot | A61C 1/142 433/165 |
| 5,261,818 A | 11/1993 | Shaw | |
| 5,569,035 A * | 10/1996 | Balfour | A61C 8/0089 433/165 |
| 5,791,902 A * | 8/1998 | Lauks | A61C 8/0089 433/165 |
| 5,941,706 A * | 8/1999 | Ura | A61C 3/02 433/165 |
| 6,106,292 A * | 8/2000 | Hollander | A61C 8/0089 408/59 |
| D445,186 S | 1/2001 | Mangione | |
| 6,319,005 B1 * | 11/2001 | Hollander | A61C 8/0089 408/59 |
| 6,364,662 B1 * | 4/2002 | Kumar | A61B 17/1673 433/165 |
| D460,331 S | 7/2002 | Mangione | |
| 6,419,490 B1 * | 7/2002 | Kitchings Weathers, Jr. | A61C 8/0089 433/165 |
| 6,517,581 B2 * | 2/2003 | Blarney | A61B 17/1668 606/172 |
| 6,641,395 B2 * | 11/2003 | Kumar | A61B 17/1615 433/165 |
| 7,211,061 B1 | 5/2007 | Maxwell | |
| D571,046 S | 1/2008 | Ponzini | |

(Continued)

OTHER PUBLICATIONS

International Search Report in corresponding International Patent Application PCT/US2021/015003, dated Apr. 15, 2021, 8 pgs.

*Primary Examiner* — Nicholas D Lucchesi
*Assistant Examiner* — Hao D Mai
(74) *Attorney, Agent, or Firm* — Young Basile Hanlon & MacFarlane, P.C.

(57) ABSTRACT

A dental implement is disclosed that includes a proximal end portion; a distal end portion that includes a cutting head defining at least one cutting surface; and a guide body that is positioned proximally of the cutting head. The guide body defines at least one flute that extends in generally parallel relation to a longitudinal axis of the dental implement and is configured to direct irrigation fluid to a surgical site within a patient.

3 Claims, 4 Drawing Sheets

(56) References Cited

U.S. PATENT DOCUMENTS

| | | | |
|---|---|---|---|
| 7,695,279 B2* | 4/2010 | Hirsch | A61B 90/94 408/202 |
| 8,899,984 B2 | 12/2014 | Llop et al. | |
| D742,506 S | 11/2015 | Burke | |
| D768,292 S | 10/2016 | Maher | |
| D815,734 S | 4/2018 | Burke | |
| D872,299 S | 1/2020 | Trump et al. | |
| D898,911 S | 10/2020 | Beer et al. | |
| D901,684 S | 11/2020 | Angert | |
| D901,685 S | 11/2020 | Wang | |
| D902,402 S | 11/2020 | Wang | |
| D940,304 S | 1/2022 | Thau et al. | |
| D965,149 S | 9/2022 | Kaspo | |
| 2010/0173259 A1* | 7/2010 | Vogel | A61C 1/084 433/72 |
| 2014/0220508 A1 | 8/2014 | Scalise et al. | |
| 2018/0369553 A1 | 12/2018 | Siciliano | |
| 2021/0015496 A1* | 1/2021 | Lee | A61B 17/1673 |
| 2021/0236237 A1 | 8/2021 | Kaspo | |

* cited by examiner

DENTAL IMPLEMENT

CROSS-REFERENCE TO RELATED APPLICATIONS

None.

TECHNICAL FIELD

The present disclosure relates generally to dental implements (e.g., dental drills) and, more specifically, to a dental implement including a fluted guide body that is configured to direct irrigation fluid to a surgical site within a patient's mouth.

BACKGROUND

Certain dental procedures necessitate the removal of material and/or tissue during surgery. For example, in the context of dental prosthetics, a dental implement (e.g., a dental drill) is typically used to form one or more bores in a patient's upper and/or lower jaw bone to allow for the placement of anchor(s) and the subsequent attachment of the dental prosthetic(s). To reduce heat generated during formation of the bore(s), both internal and external irrigation systems have been developed that supply irrigation fluid to the surgical site. The present disclosure improves upon this technique by providing a dental implement that includes a fluted guide body, which allows for an increase in the volume of irrigation fluid communicated to the surgical site.

SUMMARY

In one aspect of the present disclosure, a dental implement is described that includes a proximal end portion; a distal end portion; a guide body located between the proximal end portion and the distal end portion; and a stop formed integrally with the guide body that extends radially outward therefrom.

The proximal end portion of the dental implement is configured for connection to a drive apparatus (e.g., a dental drill or other such instrument or mechanism) to facilitate rotation of the dental implement, and the distal end portion includes a cutting head that defines at least one cutting surface and a first transverse cross-sectional dimension.

The guide body is located between the proximal end portion and the distal end portion and defines a second transverse cross-sectional dimension that is greater than the first transverse cross-sectional dimension. The guide body includes a first flute that extends in generally parallel relation to a longitudinal axis of the dental implement; a second flute that extends in generally parallel relation to the first flute; and a third flute that extends in generally parallel relation to the first flute and the second flute. The first flute, the second flute, and the third flute are each configured to direct irrigation fluid to a surgical site within a patient and are spaced circumferentially from each other such that the guide body defines an interrupted outer wall.

The stop is configured for contact with a surgical guide that is positioned adjacent to the surgical site within the patient to limit advancement of the dental implement.

In certain embodiments, the first flute, the second flute, and the third flute may be spaced approximately equidistant from each other about a circumference of the guide body.

In certain embodiments, the stop may extend radially outward from a proximal end of the guide body.

In certain embodiments, the stop may define a third transverse cross-sectional dimension that is greater than the second transverse cross-sectional dimension.

In another aspect of the present disclosure, a dental implement is disclosed that includes a proximal end portion; a distal end portion; and a guide body. The distal end portion includes a cutting head defining at least one cutting surface, and the guide body is positioned proximally of the cutting head. The guide body defines at least one flute that extends in generally parallel relation to a longitudinal axis of the dental implement and is configured to direct irrigation fluid to a surgical site within a patient.

In certain embodiments, the at least one flute may include a plurality of flutes.

In certain embodiments, the plurality of flutes may be spaced approximately equidistant from each other about a circumference of the guide body.

In certain embodiments, the plurality of flutes may include a first flute; a second flute that is spaced circumferentially from the first flute; and a third flute that is spaced circumferentially from the first flute and the second flute, whereby the guide body defines an interrupted outer wall.

In certain embodiments, the at least one flute may define a base wall and a pair of side walls that extend radially outwardly from the base wall.

In certain embodiments, the pair of side walls may extend in generally parallel relation to each other.

In certain embodiments, the pair of side walls may extend in generally parallel relation to the longitudinal axis of the dental implement.

In certain embodiments, the pair of side walls may extend in generally orthogonal relation to the base wall.

In certain embodiments, the dental implement may further include a stop that extends radially outward from the guide body.

In certain embodiments, the guide body may define a proximal end and a distal end.

In certain embodiments, the stop may extend radially outward from the proximal end of the guide body.

In certain embodiments, the stop may be formed integrally with the guide body.

In another aspect of the present disclosure, a dental implement is disclosed that includes a cutting head defining a proximal end, a distal end, and at least one cutting surface; a guide body that is located adjacent to the proximal end of the cutting head; and a stop that is formed integrally with the guide body and extends radially outward therefrom. The guide body defines at least one longitudinal flute that is configured to facilitate communication of an irrigation fluid to a surgical site within a patient.

In certain embodiments, the guide body may extend radially outward from the proximal end of the cutting head.

In certain embodiments, the at least one longitudinal flute may extend in generally parallel relation to a longitudinal axis of the dental implement.

In certain embodiments, the at least one longitudinal flute may define a base wall and a pair of side walls that extend radially outwardly from the base wall in generally parallel relation to the longitudinal axis of the dental implement.

In certain embodiments, the at least one longitudinal flute may include a first longitudinal flute and a second longitudinal flute that is spaced circumferentially from the first longitudinal flute, whereby the guide body defines an interrupted outer wall.

BRIEF DESCRIPTION OF THE DRAWINGS

The disclosure is best understood from the following detailed description when read in conjunction with the accompanying drawings. It is emphasized that, according to common practice, the various features of the drawings may not be to scale, and the dimensions of the various components may be arbitrarily expanded or reduced for clarity.

DETAILED DESCRIPTION

The present disclosure describes a dental implement (e.g., a dental drill bit) that is configured for connection to (and use with) a drive apparatus (e.g., a dental drill or other such instrument or mechanism) during a surgical (dental) procedure in which one or more bores are formed at a surgical site (e.g., a patient's upper and/or lower jaw bone). The dental implement includes a cutting head and a guide body that is positioned proximally of the cutting head. The guide body defines one or more longitudinal flutes that are configured to direct irrigation fluid to the surgical site during the course of the procedure to reduce heat generated during formation of the bore(s). The dental implement described herein may, thus, obviate the need for spoons, keys, or external irrigation systems and may allow for single-handed operation.

Figure 1:
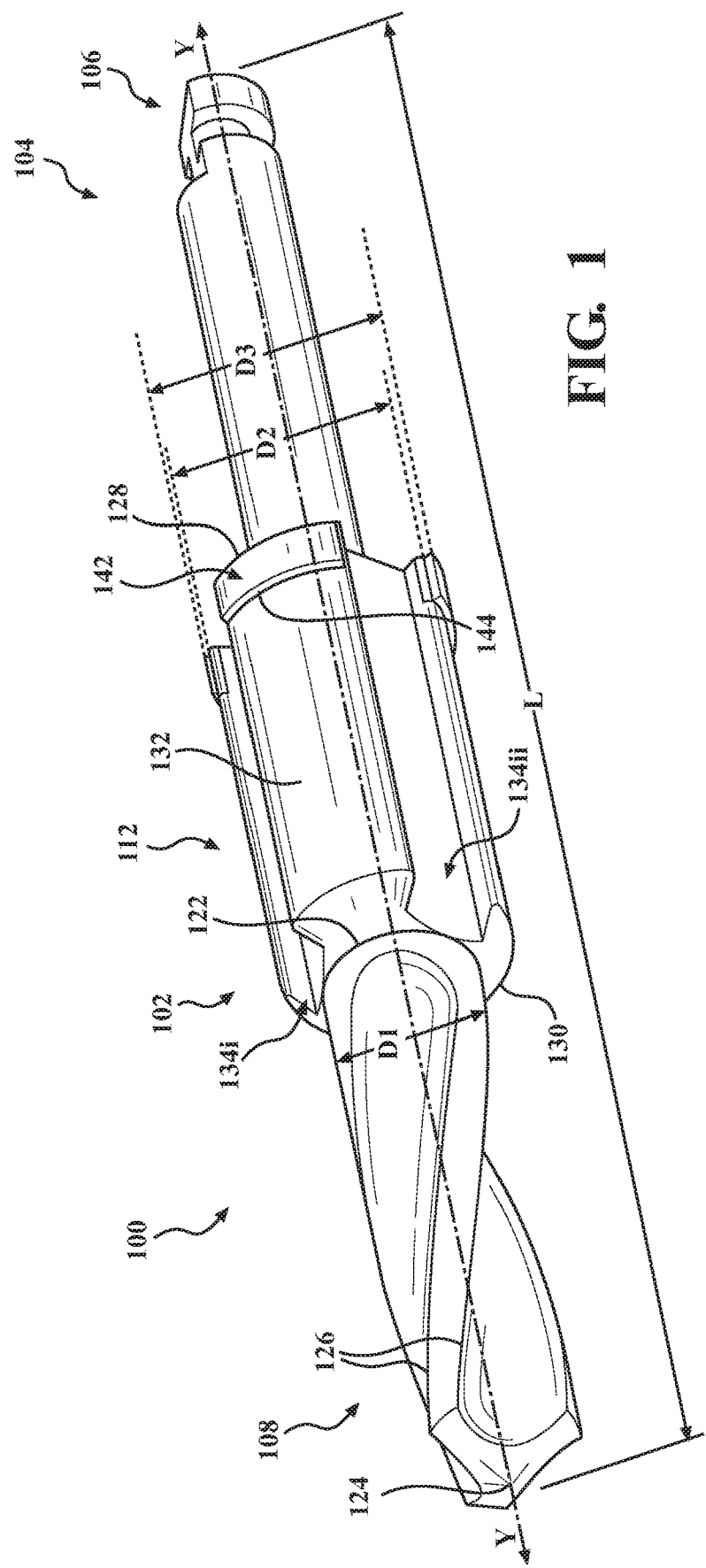
FIG. 1 is a side, perspective view of a dental implement according to the principles of the present disclosure.
Figure 2:
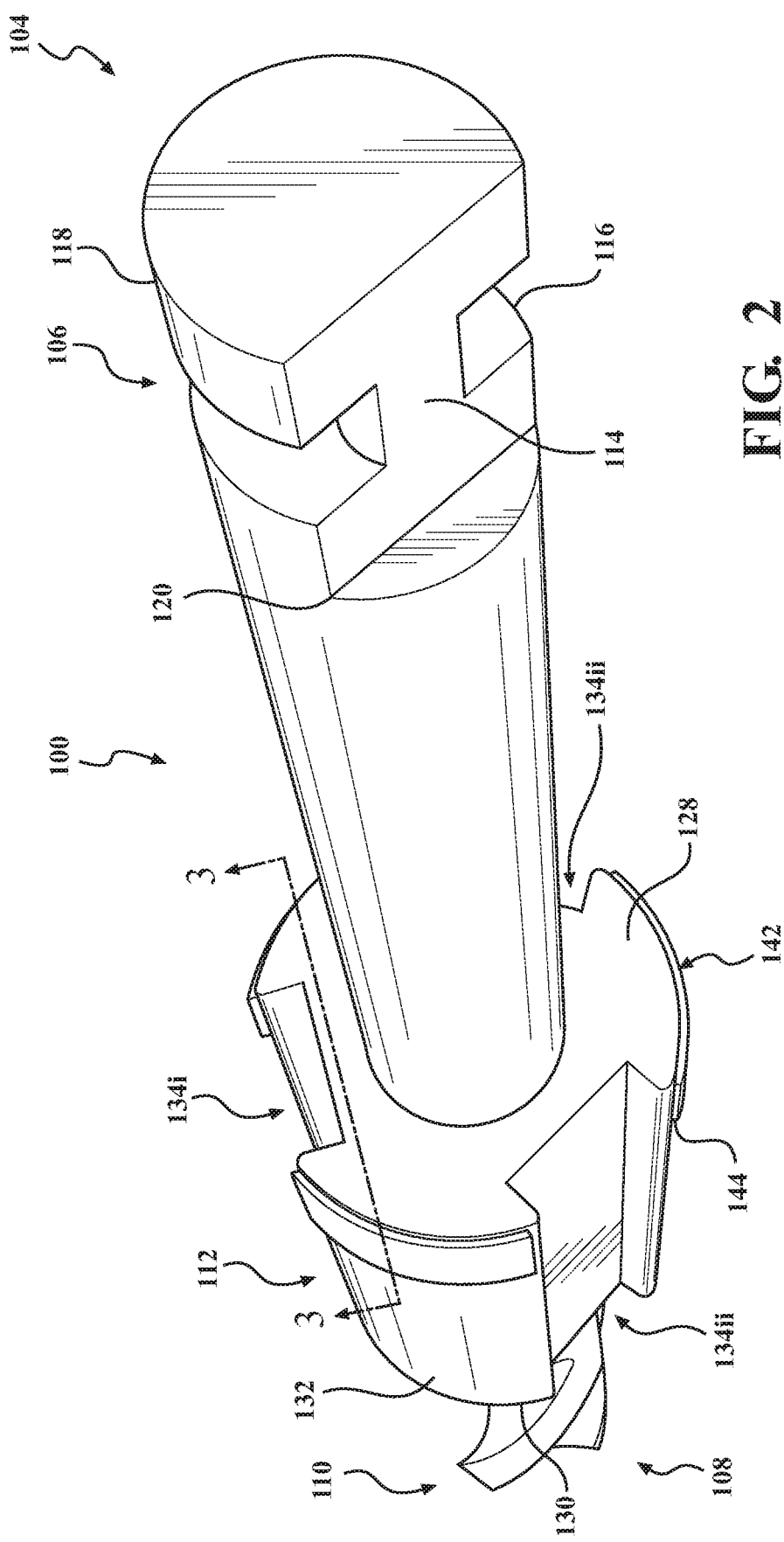
FIG. 2 is an end, perspective view of the dental implement seen in FIG. 1.

FIGS. 1 and 2 illustrate one embodiment of the presently disclosed dental implement, which is identified by the reference character 100. The dental implement 100 is configured as a dental drill bit 102 for use in forming one or more bores at a surgical site (e.g., a patient's upper and/or lower jaw bone) during a dental procedure (e.g., to facilitate the placement of one or more implants). The dental implement 100 may include (e.g., may be formed partially or entirely from) any suitable material or combination of materials, such as, for example, stainless steel, titanium, etc. The dental implement 100 defines a length L (FIG. 1) extending along a longitudinal axis Y and includes a proximal end portion 104 with an engagement structure 106; a distal end portion 108 with a cutting head 110 defining a (first) transverse cross-sectional dimension (e.g., a diameter) D1 that extends orthogonally in relation to the longitudinal axis Y; and a guide body 112 that is positioned between the proximal end portion 104 and the distal end portion 108. Throughout the following discussion, the term "proximal" (and the like) should be understood as referring to that portion of the dental implement 100 (or the relevant component thereof) that is closest to the operator (clinician) during use and the term "distal" (and the like) should be understood as referring to that portion of the dental implement 100 (or the relevant component thereof) that is furthest from the operator (clinician) during use.

To increase versatility, it is envisioned that the dental implement 100 may be provided in a variety of lengths L and with a cutting head 110 that varies in its transverse cross-sectional dimension D1. For example, it is envisioned that the dental implement 100 may be provided with a length L of (approximately) 17 mm, (approximately) 21 mm, (approximately) 25 mm, etc., and with a cutting head 110 having a transverse cross-sectional dimension D1 of (approximately) 2.0 mm, (approximately) 2.5 mm, (approximately) 2.8 mm, (approximately) 3.0 mm, (approximately) 3.3 mm, (approximately) 3.5 mm, (approximately) 3.8 mm, (approximately) 4.0 mm, (approximately) 4.3 mm, (approximately) 4.7 mm, (approximately) 5.3 mm, etc., in various combinations. Embodiments in which the length L and/or the transverse cross-sectional dimension D1 of the cutting head 110 deviate from the ranges and specifications enumerated above, however, would not be beyond the scope of the present disclosure.

The engagement structure 106 at the proximal end portion 104 of the dental implement 100 is configured for connection to (engagement with) a drive apparatus (not shown), such as a dental drill or other such instrument or mechanism, to facilitate controlled rotation of the dental implement 100. In the specific embodiment of the dental implement 100 shown throughout the figures, the engagement structure 106 is generally D-shaped in configuration and defines a generally planar side wall 114 (FIG. 2) and an inwardly extending recess 116 that is spaced axially (along the longitudinal axis Y) from respective proximal and distal ends 118, 120 of the engagement structure 106. It should be appreciated, however, that the specific configuration of the engagement structure 106 may be varied in alternate embodiments (e.g., to facilitate use with a variety of dental drills) without departing from the scope of the present disclosure.

The cutting head 110 defines respective proximal and distal ends 122, 124 (FIG. 1) and includes one or more cutting surfaces 126 that are configured to remove material from the surgical site (e.g., from the patient's jaw bone). Although the cutting head 110 is illustrated as defining six cutting surfaces 126 that extend in a spiraled configuration in the particular embodiment seen throughout the figures, it should be appreciated that alternate configurations for the cutting head 110 would not be beyond the scope of the present disclosure. For example, embodiments including greater and few numbers of cutting surfaces 126 are contemplated herein, as are embodiments in which the cutting surface(s) 126 extend in (generally) parallel relation to the longitudinal axis Y of the dental implement 100.

The guide body 112 defines a proximal end 128 and a distal end 130 and is located between the respective proximal and distal end portions 104, 108 of the dental implement 100. More specifically, in the particular embodiment illustrated throughout the figures, the guide body 112 is positioned such that the distal end 130 of the guide body 112 is positioned adjacent to the proximal end 122 of the cutting head 110. Although shown as being an integral (e.g., monolithic) component of the dental implement 100 throughout the figures, whereby the (rotational and axial) position of the guide body 112 is fixed in relation to the respective proximal and distal end portions 104, 108, in alternate embodiments of the disclosure, it is envisioned that the guide body 112 may be configured as a movable component of the dental implement 100. For example, the guide body 112 may be supported so as to allow for relative rotation and/or axial translation (along the longitudinal axis Y) between the guide body 112 and the cutting head 110, for example. To facilitate such relative movement, it is envisioned that the dental implement 100 may include any suitable structure(s) and/or mechanism(s) (e.g., a bearing assembly or the like).

The guide body 112 defines a (second) transverse cross-sectional dimension (e.g., a diameter) D2 that extends orthogonally in relation to the longitudinal axis Y of the dental implement 100. As seen in FIG. 1, for example, the (second) transverse cross-sectional dimension D2 defined by the guide body 112 may be greater than the (first) transverse cross-sectional dimension D1 defined by the cutting head 110. As such, it is envisioned that the guide body 112 may extend radially outward from (relative to) the cutting head 110. In the particular embodiment of the disclosure seen throughout the figures, for example, the guide body 112 is solid and defines a cross-sectional dimension D2 of (approximately) 5 mm. Embodiments in which the guide body 112 may be hollow are also contemplated herein, however, as are embodiments in which the guide body 112 may define larger and smaller cross-sectional dimensions D2.

The guide body 112 defines an outer wall 132 and at least one longitudinal flute (channel) 134 that extends radially inward from the outer wall 132. Each flute 134 is configured to direct irrigation fluid distally (i.e., towards the surgical site within the patient's mouth) as the dental implement 100 rotates during use, which may obviate the need for external irrigation systems (as well as spoons, keys, etc.) and may allow for single-handed operation. Although shown as including a first flute 134$i$, a second flute 134$ii$, and a third flute 134$iii$ throughout the figures, it should be appreciated that the guide body 112 may include greater and few numbers of flutes 134 in alternate embodiments of the disclosure. For example, an embodiment in which the guide body 112 includes a pair of flutes 134 is also contemplated herein, as is an embodiment in which the guide body 112 includes a single flute 134.

In the illustrated embodiment, each flute 134 extends in generally parallel relation to the longitudinal axis Y of the dental implement 100, whereby the flutes 134$i$, 134$ii$, 134$iii$ extend in generally parallel relation to each other. Embodiments in which one or more of the flutes 134 extend in non-parallel relation to the longitudinal axis Y, however, are also contemplated herein. For example, embodiments in which one or more of the flutes 134 include an arcuate (e.g., spiraled) configuration are also contemplated herein (e.g., to facilitate rotational circulation of the irrigation fluid, to increase the volume of irrigation fluid communicated to the surgical site, etc.).

The flutes 134 are spaced angularly from each other about the periphery (circumference) of the guide body 112, whereby the outer wall 132 of the guide body 112 includes an interrupted, non-continuous configuration. More specifically, the first flute 134$i$ is spaced (circumferentially) from the respective second and third flutes 134$ii$, 134$iii$, the second flute 134$ii$ is spaced (circumferentially) from the respective first and third flutes 134$i$, 134$iii$, and the third flute 134$iii$ is spaced (circumferentially) from the respective first and second flutes 134$i$, 134$ii$. Although shown as being spaced approximately equidistant from each other in the illustrated embodiment (i.e., such that midpoints of each flute 134 are separated by approximately 120°), it should be appreciated that the relative locations of the flutes 134 may be varied without departing from the scope of the present disclosure. As such, embodiments in which the angular spacing between adjacent flutes 134 may be unequal are also contemplated herein.

Figure 3A:
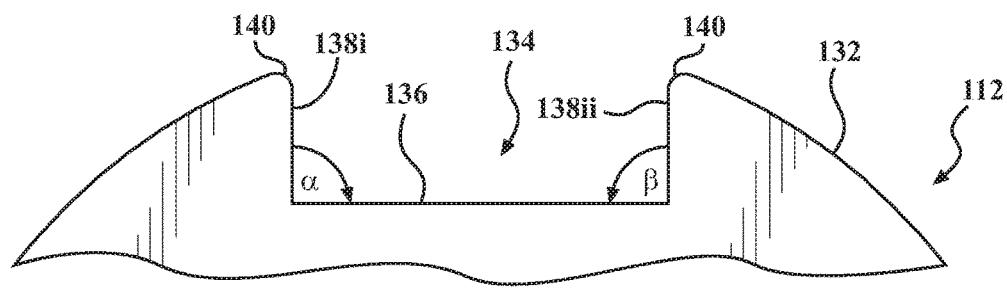
FIG. 3A is a partial, (longitudinal) cross-sectional view of the dental implement taken through line 3-3 in FIG. 2.
Figure 3B:
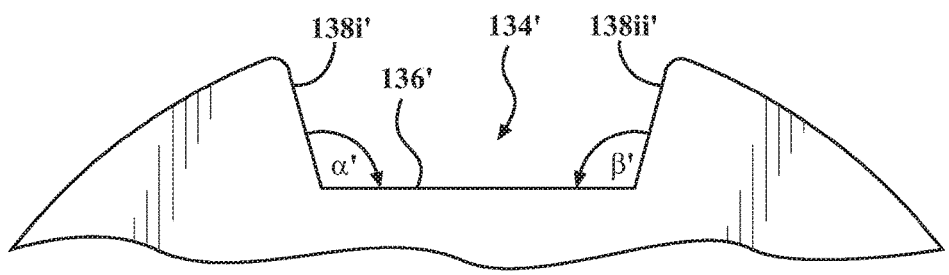
FIG. 3B is a partial, (longitudinal) cross-sectional view of the dental implement according to an alternate embodiment of the disclosure.
Figure 3C:
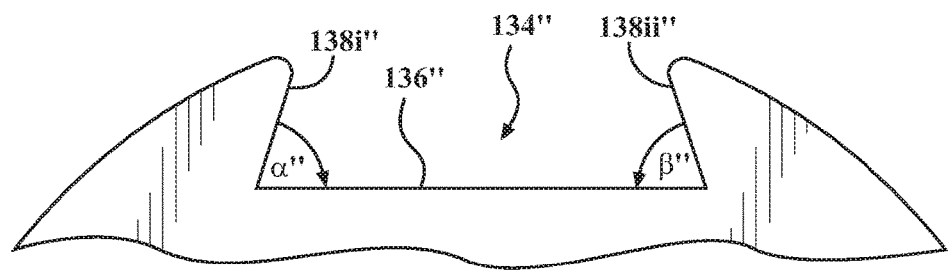
FIG. 3C is a partial, (longitudinal) cross-sectional view of the dental implement according to another alternate embodiment of the disclosure.
Figure 3D:
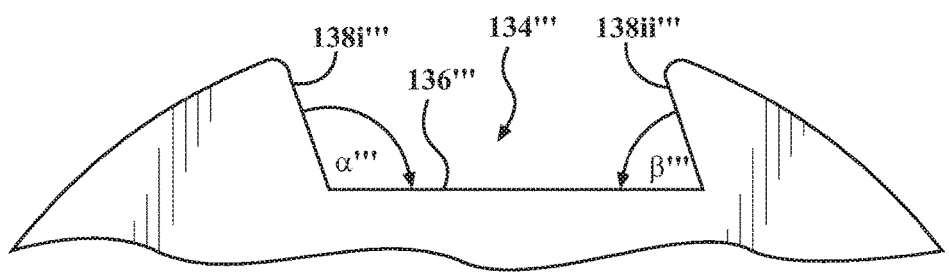
FIG. 3D is a partial, (longitudinal) cross-sectional view of the dental implement according to another alternate embodiment of the disclosure.

With reference to FIG. 3A, each flute 134 defines a base wall 136 and a pair of side walls 138$i$, 138$ii$ that extend radially outward from the base wall 136 to the outer wall 132 of the guide body 112. More specifically, the side walls 138$i$, 138$ii$ extend between the base wall 136 and the outer wall 132 so as to define radiused corner portions 140 and subtend angles α, β with the base wall 136, respectively. As seen in FIG. 3A, the flutes 134 may be configured such that the side walls 138$i$, 138$ii$ extend from the base wall 136 in generally orthogonal relation (e.g., such that the angles α, β are each approximately 90°), whereby the side walls 138$i$, 138$ii$ extend in generally parallel relation to each other and the longitudinal axis Y (FIG. 1) of the dental implement 100 to thereby attribute a generally U-shaped configuration to each flute 134. In alternate embodiments of the disclosure, however, it is envisioned that the side walls 138$i$, 138$ii$ may extend from the base wall 136 in non-orthogonal relation, whereby the side walls 138$i$, 138$ii$ extend in non-parallel relation to each other. For example, FIG. 3B illustrates a flute 134' in which the side walls 138$i$', 138$ii$' subtend (identical) obtuse angles α', β' with the base wall 136' and extend away from each other, and FIG. 3C illustrates a flute 134" in which the side walls 138$i$", 138$ii$" subtend (identical) acute angles α", β" with the base wall 136" and extend towards each other. FIG. 3D illustrates another flute 134''' in which the side walls 138$i$''', 138$ii$''' subtend non-identical angles with the base wall 136'''. More specifically, the flute 134''' is configured such that the side wall 138$i$''' subtends an obtuse angle α''' with the base wall 136''' and the side wall 138$ii$''' subtends an acute angle β''' with the base wall 136'''.

While each of the flutes 134 is illustrated as being identical in the embodiment of the dental implement seen in FIGS. 1 and 2, embodiments of the dental implement 100 are also envisioned in which the flutes 134 may be non-identical. For example, embodiments of the dental implement 100 including a combination of the flutes 134 (FIG. 3A), 134' (FIG. 3B), 134" (FIG. 3C), 134''' (FIG. 3D) are also contemplated herein.

Figure 4:
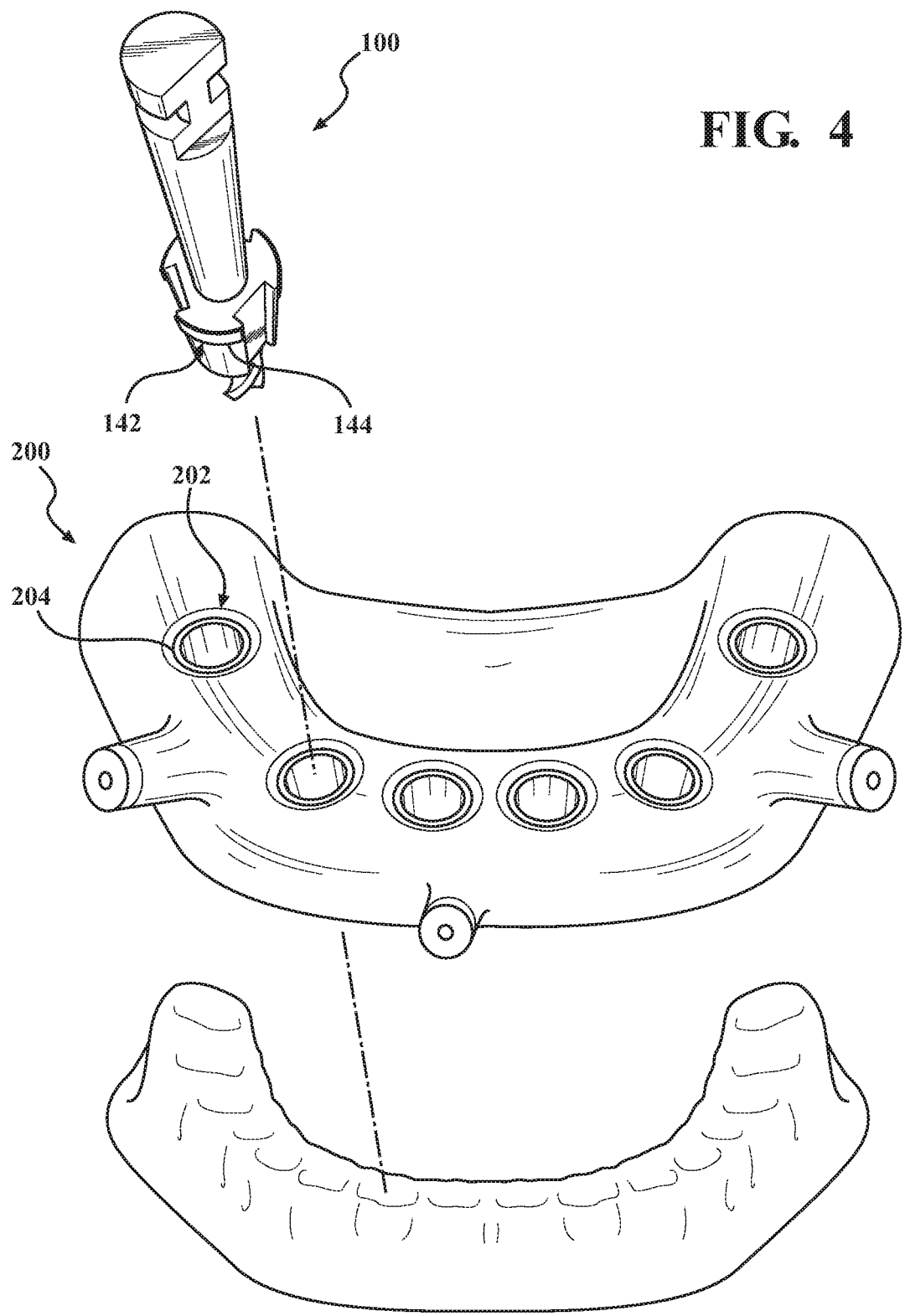
FIG. 4 is a top, perspective view illustrating use of the dental implement with a surgical guide during a surgical procedure.

With reference now to FIGS. 1, 2, and 4, use of the dental implement 100 will be discussed in connection with a surgical guide 200 during the course of a surgical procedure. When utilized, the surgical guide 200 is positioned within the patient's mouth adjacent to the intended surgical site. The dental implement 100 can then be connected to the drive apparatus and inserted through the surgical guide 200 via openings 202, each of which may include a fitted sleeve 204. To limit advancement of the dental implement 100 and prevent over-insertion (e.g., the removal of excessive material from the surgical site), in certain embodiments, the dental implement 100 may include a stop 142 that is configured for engagement (contact) with the surgical guide 200 (e.g., the sleeves 204). In the illustrated embodiment, for example, the stop 142 is formed integrally with the guide body 112 and extends radially outward from the proximal end 128 thereof so as to define a flange 144. The flange 144 defines a (third) transverse cross-sectional dimension (e.g., a diameter) D3 (FIG. 1) that extends in orthogonal relation to the longitudinal axis Y of the dental implement 100. As illustrated throughout the figures, the (third) transverse cross-sectional dimension D3 defined by the flange 144 may be greater than the (second) transverse cross-sectional dimension D2 defined by the guide body 112.

During use of the dental implement 100, as material is removed from the surgical site during formation of the bore(s), the dental implement 100 is advanced until the stop 142 (e.g., the flange 144) is brought into abutment with the surgical guide 200, thereby preventing the continued removal of material and over-advancement of the dental implement 100.

In addition to limiting axial advancement of the dental implement 100, it is envisioned that the stop 142 may act a depth gauge that allows the operator (clinician) to assess the depth of the bore(s) by visually assessing the distance between the stop 142 and the surgical guide 200. Although shown as being integrally (e.g., monolithically) formed with the guide body 112 throughout the figures, in alternate embodiments of the disclosure, it is envisioned that the location of the stop 142 may be varied and/or that the stop 142 may be movably connected to the dental implement 100. For example, it is envisioned that the stop 142 may be relocatable along the longitudinal axis Y to allow for selective variation in the depth of the bore(s) formed at the surgical site.

Although discussed in connection with the surgical guide 200 in the context of FIG. 4, it is envisioned that the dental implement 100 may be utilized without the surgical guide 200 in alternate implementations.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein are also within the abilities of a person having ordinary skill in the art, and, thus, are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationships between the various structures illustrated in the accompanying drawings, and to the spatial orientations of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various steps, operations, elements, components, regions, and/or sections, these steps, operations, elements, components, regions, and/or sections should not be limited by the use of these terms in that these terms are used to distinguish one step, operation, element, component, region, or section from another. Thus, unless expressly stated otherwise, a first step, operation, element, component, region, or section could be termed a second step, operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A dental implement defining a longitudinal axis and comprising:
    a proximal end portion configured for connection to a drive apparatus to facilitate rotation of the dental implement;
    a distal end portion including a cutting head defining at least one cutting surface; and
    a guide body positioned proximally of the at least one cutting surface and defining a maximum transverse cross-section of the dental implement extending in generally orthogonal relation to the longitudinal axis, the guide body including:
        a first flute extending in generally parallel relation to the longitudinal axis of the dental implement;
        a second flute extending in generally parallel relation to the first flute; and
        a third flute extending in generally parallel relation to the first flute and the second flute, wherein the first flute, the second flute, and the third flute are each configured to direct irrigation fluid to a surgical site within a patient and are spaced circumferentially from each other such that the guide body defines an interrupted outer wall, wherein the first flute, the second flute, and the third flute extend between a proximal end of the guide body and a distal end of the guide body; and
    a stop formed integrally with the guide body and extending radially outward therefrom, the stop being configured for contact with a surgical guide positioned adjacent to the surgical site within the patient to limit advancement of the dental implement and defining the maximum transverse cross-section.

2. The dental implement of claim 1, wherein the first flute, the second flute, and the third flute are spaced approximately equidistant from each other about a circumference of the guide body.

3. The dental implement of claim 1, wherein the stop extends radially outward from flail the proximal end of the guide body.

* * * * *

UNITED STATES PATENT AND TRADEMARK OFFICE
CERTIFICATE OF CORRECTION

PATENT NO. : 11,576,748 B2
APPLICATION NO. : 16/776746
DATED : February 14, 2023
INVENTOR(S) : Ghabi Kaspo It is certified that error appears in the above-identified patent and that said Letters Patent is hereby corrected as shown below:

In the Claims
At Column 8, Claim 3, Line number 62, Delete "flail"

Signed and Sealed this
Tenth Day of September, 2024

Katherine Kelly Vidal
*Director of the United States Patent and Trademark Office*